United States Patent
Hasegawa et al.

(10) Patent No.: US 8,492,939 B2
(45) Date of Patent: Jul. 23, 2013

(54) FAN MOTOR USING EPOXY RESIN

(75) Inventors: Takakazu Hasegawa, Nagano (JP); Seiichi Tsukutani, Nagano (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 267 days.

(21) Appl. No.: 12/874,537

(22) Filed: Sep. 2, 2010

(65) Prior Publication Data

US 2011/0074230 A1 Mar. 31, 2011

(30) Foreign Application Priority Data

Sep. 30, 2009 (JP) ................................. 2009-227769

(51) Int. Cl.
*H02K 1/04* (2006.01)
*H02K 15/12* (2006.01)
*H02K 5/08* (2006.01)

(52) U.S. Cl.
CPC ...................................... *H02K 5/08* (2013.01)
USPC .............................. 310/43; 310/58; 310/68 R

(58) Field of Classification Search
CPC ............ H02K 5/08; H02K 15/12; H02K 5/225
USPC ........................................... 310/43, 58, 68 R
See application file for complete search history.

(56) References Cited

U.S. PATENT DOCUMENTS

| | | | |
|---|---|---|---|
| 4,387,311 A * | 6/1983 | Kobayashi et al. | 310/43 |
| 5,436,519 A * | 7/1995 | Takahashi et al. | 310/216.114 |
| 5,623,006 A * | 4/1997 | Papathomas | 524/100 |
| 6,359,354 B1 * | 3/2002 | Watanabe et al. | 310/87 |
| 7,117,580 B2 * | 10/2006 | Kudou et al. | 29/596 |
| 7,667,359 B2 * | 2/2010 | Lee et al. | 310/86 |
| 2002/0146565 A1 * | 10/2002 | Ishll et al. | 428/413 |
| 2003/0173851 A1 * | 9/2003 | Kudou et al. | 310/156.12 |
| 2004/0205956 A1 * | 10/2004 | Kudou et al. | 29/596 |
| 2005/0227077 A1 * | 10/2005 | Sugiyama | 428/407 |
| 2007/0085426 A1 * | 4/2007 | Lee et al. | 310/43 |
| 2007/0145842 A1 * | 6/2007 | Zhu et al. | 310/88 |
| 2008/0054735 A1 * | 3/2008 | Yoshida et al. | 310/43 |
| 2011/0074230 A1 * | 3/2011 | Hasegawa et al. | 310/43 |

FOREIGN PATENT DOCUMENTS

| | | |
|---|---|---|
| JP | 2001-128408 A | 5/2001 |
| JP | 2006-246557 A | 9/2006 |

OTHER PUBLICATIONS

Loctite Epoxy Resin E-60NC, Technical Data Sheet, Aug. 2001.*

* cited by examiner

*Primary Examiner* — John K Kim
(74) *Attorney, Agent, or Firm* — Carrier Blackman & Associates, P.C.; Joseph P. Carrier; William D. Blackman

(57) ABSTRACT

A fan motor is provided. The fan motor includes a case having a cylindrical bearing housing, and a base unit fixing the cylindrical bearing housing; a pair of bearings fitted into the cylindrical bearing housing; a stator which has a wound coil and a bottom portion to which a PC board including a motor driving circuit and a lead wire for supplying the motor driving circuit with electrical current is fixed; a shaft supported by the pair of bearings; a rotor which faces the stator and is fixed to the shaft, and which has a magnet; and an impeller which is fixed to an outer peripheral portion of the rotor, and has plural blades. The stator, the PC board and the lead wire are molded by epoxy resin which has hardness of Shore D85 to D95 after curing and a glass transition temperature of 125° C. or higher.

8 Claims, 5 Drawing Sheets

1

FAN MOTOR USING EPOXY RESIN

BACKGROUND OF THE INVENTION

1. Field of the Invention

The present invention relates to a fan motor, and particularly to an oil-proof and water-proof fan motor which is used in Factory Automation (FA) equipments of machines such as industrial machines, machine tools or the like which are exposed to water and/or cutting fluid.

2. Description of the Related Art

In a related-art technique, an axial-flow fan is installed near a control unit of machine tools or the like to cool off the control unit. As a motor of the axial-flow fan, an oil-proof and water-proof fan motor is used since the motor may be exposed to water or cutting fluid (for example, JP-A-2001-128408 and JP-A-2006-246557).

In JP-A-2001-128408, a motor is accommodated in a case and thereafter is molded using epoxy resin having Shore hardness of D30 to D90. In JP-A-2006-246557, a coil of a core unit and a PC board including electronic parts is accommodated in a die and is molded using epoxy resin cured by an aromatic amine-based curing agent.

Conventionally, water-proof and cutting fluid-proof properties are provided by increasing the hardness of the epoxy resin, but due to the high hardness, it is likely to cause high stress inside the resin. During a thermal shock test for a deterioration evaluation of the epoxy resin, there is a possibility that cracks occur in the epoxy resin due to a difference in thermal expansion between the epoxy resin and component parts of the fan motor, and therefore, the component parts may be damaged.

Accordingly, epoxy resin with low hardness and low glass transition temperature is selected to reduce stress thereof with its flexibility and to have thermal shock-resistant property. Among them, epoxy resin having superior water-proof and cutting fluid-proof properties has been employed. Physical properties of typical epoxy resin for such use are as follows: Hardness after curing: Shore D60; Glass transition temperature $T_g$: 15° C. or lower; and Linear expansion coefficient ($10^{-5}/°$ C.): 4.8 ($T_g$ or lower) and 15.0 ($T_g$ or higher).

However, in a case where the hardness and glass transition temperature are lowered in order to obtain the thermal shock-resistant property, there is possibility that the epoxy resin does not have sufficient water-proof and cutting fluid-proof properties. Conversely, if the hardness of the epoxy resin is increased in order to secure sufficient water-proof and cutting fluid-proof properties, there is possibility that the epoxy resin does not have the sufficient thermal shock-resistant property. Therefore, it is difficult to take balance between the water-proof and cutting fluid-proof properties and the thermal shock-resistant property without deteriorating either of them.

SUMMARY OF THE INVENTION

The present invention has been made to overcome the problem as described above, and it is an object of the present invention to provide a fan motor which secures required water-proof and cutting fluid-proof properties and thermal shock-resistant property to be usable for long term even under the condition that the fan motor is exposed to the cutting fluid.

According to an aspect of the present invention, there is provided a fan motor including: a case including a cylindrical bearing housing provided at a center thereof, and a base unit fixing the cylindrical bearing housing; a pair of bearings fitted into the cylindrical bearing housing; a stator which has a wound coil and a bottom portion to which a PC board including a motor driving circuit and a lead wire for supplying the motor driving circuit with electrical current is fixed; a shaft supported by the pair of bearings; a rotor which faces the stator and is fixed to the shaft, and which has an inner peripheral face to which a magnet is attached; and an impeller which is fixed to an outer peripheral portion of the rotor, and includes a plurality of blades. The stator, the PC board and the lead wire are molded by epoxy resin which has hardness of Shore D85 to D95 after curing and a glass transition temperature of 125° C. or higher.

According to this configuration, the stator, the PC board and the lead wire are molded as one body by the epoxy resin which has hardness of Shore D85 to D95 after curing and a glass transition temperature of 125° C. or higher. Accordingly, a difference in thermal expansion between the epoxy resin and the component parts decreases, and therefore, the occurrence of inner stress can be reduced, so that the water-proof and cutting fluid-proof properties and the thermal shock-resistant property can be secured. As a result, the fan motor can be used for long term even under the condition that the fan motor is exposed to the cutting fluid.

In the above fan motor, the epoxy resin may include 40 to 60 mass % of inorganic particles as an additive agent. An example of the inorganic particles may be ceramic particles.

According to this configuration, since the epoxy resin includes 40 to 60 mass % of inorganic particles as the additive agent, the hardness of Shore D85 to D95 after curing and the glass transition temperature of 125° C. or higher can be secured as physical properties of the epoxy resin.

In the above fan motor, the epoxy resin has a linear expansion coefficient of $3.7 \times 10^{-5}/°$ C. in the temperature range not higher than the glass transition temperature.

According to this configuration, the linear expansion coefficient of the epoxy resin in the range not higher than the glass transition temperature is the relatively small value of $3.7 \times 10^{-5}/°$ C., which is smaller than that of the above-mentioned conventionally used epoxy resin. Therefore, required thermal shock-resistant property can be secured, so that various component parts included therein can be prevented from being damaged.

In the above fan motor, the molding is performed in a die to form a molded body, and thereafter, the molded body is assembled in the case.

According to this configuration, since the stator, the PC board and the lead wire are molded in a die before those components are assembled in the case, a uniform molded body can be formed, and therefore, required water-proof and cutting fluid-proof properties can be secured.

In the above fan motor, the die may include a lower die which positions the stator, a core die which is inserted into a center of the stator, an upper die which is provided on the lower die and defines an annular opening with an outer periphery of the core die, the epoxy resin being injected through the annular opening. A planar area of the annular opening is 70% or more of a planar area of the stator when viewed in an axial-direction of the core die.

The PC board assembled into one body together with the stator and the lead wire is disposed at a predetermined place on the lower die. Then, the upper die is clamped with the lower die, and then, the core die is inserted into a central opening of the annular stator. As a vacuuming operation is executed, the epoxy resin with the above-mentioned physical properties is filled from/through the annular opening formed in an upper face of the upper die. Since the planar area of the annular opening is 70% or more of the planar area of the annular stator when viewed in the axial-direction of the core die, even when the epoxy resin with high viscosity is used, air within the epoxy resin can be smoothly and easily discharged to the exterior, so that the epoxy resin can be efficiently filled into the die.

In the above fan motor, after curing the epoxy resin, an upper end face of a molded body at the annular opening side may be finished by a cutting operation.

According to this configuration, the filled resin is cured, and then, the die is removed. Thereafter, an upper end face of the molded body is subjected to the cutting and finishing operation. Therefore, a uniform gap can be formed between the molded body and a lower face of the rotor.

In the above fan motor, the PC board may include an air vent hole for injecting resin.

The epoxy resin is filled from/through the annular opening formed in an upper face of the upper die, and then, the filled resin flows downwards along the coil and the stator onto the PC board. Thereafter, air within the die and air within the resin are smoothly and easily discharged to the exterior through the air vent holes formed in the PC board, and therefore, the epoxy resin can be filled into every corner of a bottom of the PC board.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE REFERRED EMBODIMENTS

A plurality of illustrative embodiments according to the present invention will be described in details with reference to FIG. 1 to FIG. 6.

First Illustrative Embodiment

Figure 1:
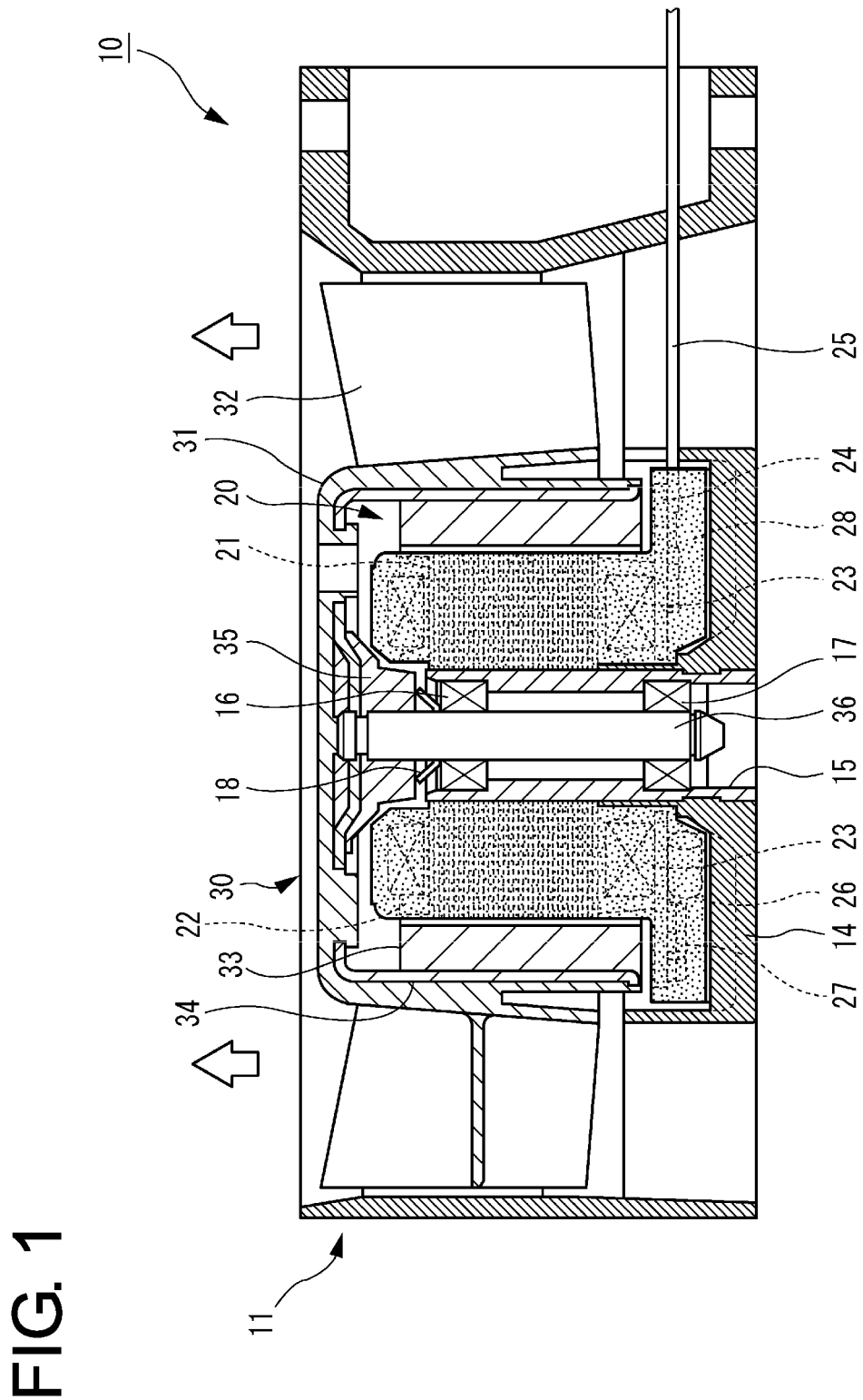
FIG. 1 is a cross sectional view of a fan motor according to a first illustrative embodiment of the present invention.

As shown in FIG. 1, a fan motor 10 according to a first illustrative embodiment of the present invention is an axial-flow fan which includes a case 11 made of synthetic resin, a stator 20 and a rotor 30 as main components.

The case 11 includes a base unit 14 provided at a center of a base end section thereof by a plurality of ribs, and a cylindrical bearing housing 15 which is fitted into a center region of the base unit 14 and into which a bearing is fitted. Ball bearings 16, 17 which rotatably support a shaft of the rotor (described later) are fitted into lower and upper positions of an interior of the bearing housing 15. In case of an axial-flow fan, the wind flows in an axial direction of the shaft (in the arrow direction).

The stator 20 includes a core 21 provided at an outer periphery of the bearing housing 15 and extending in a radial manner, a bobbin 22 mounted onto the core, and a coil 23 wound around the bobbin 22. Moreover, a PC board 24 is provided around a base portion of the bearing housing 15 and is fixed at a lower position of the bobbin 22. A driving circuit for driving the motor is provided on the PC board 24 and electronic parts are mounted on the PC board 24. Further, a lead wire 25 for supplying the driving circuit with electrical current is connected to an end of the PC board 24.

The rotor 30 includes a hub 35 made of die-cast zinc. The hub 35 is provided to an end of the shaft 36 which is rotating while being supported by the ball bearings 16, 17, to face an outer peripheral face of the stator 20, a bottomed cylindrical yoke 34 provided to the hub 35 so as to cover the bearing housing 15, and a ring-shape magnet 33 fixed to an inner peripheral face of the yoke 34. An impeller 31 including a plurality of blades 32 is fitted to an outer periphery of the yoke 34. Moreover, there is provided a coil spring 18 which is fitted to an outer side of the shaft 36 and is disposed between the hub 35 and the ball bearing 16.

Figure 3:
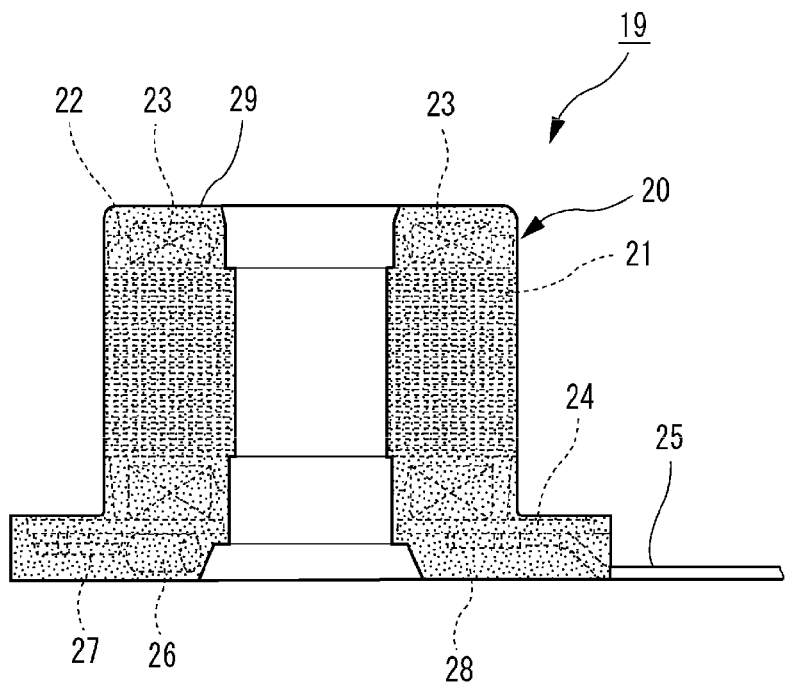
FIG. 3 is a cross sectional view of the molded body of FIG. 1.

In the fan motor 10 according to this illustrative embodiment, the stator 20, the PC board 24 and a portion of the lead wire 25 which is connected to the PC board 24 are molded as one body by epoxy resin 28 as shown in FIG. 3 before such components are assembled into the case 11. Hereinafter, this molded one body is referred to as "molded body 19".

<Composition of the Epoxy Resin>
Base material: 20 to 30 mass % of bisphenol-A
Additive agent: 40 to 60 mass % of inorganic particles
Curing agent: 20 to 30 mass % of acid anhydride <Physical Property of the Epoxy Resin>
Hardness after curing: Shore D85 to D95
Glass transition temperature $T_g$: 125° C. or higher (not lower than guaranteed temperature of a junction portion of semiconductor part in the circuit board)
Linear expansion coefficient: $3.7 \times 10^{-5}$/° C. ($T_g$ or lower) and $12.0 \times 10^{-5}$/° C. ($T_g$ or higher.

Figure 2:
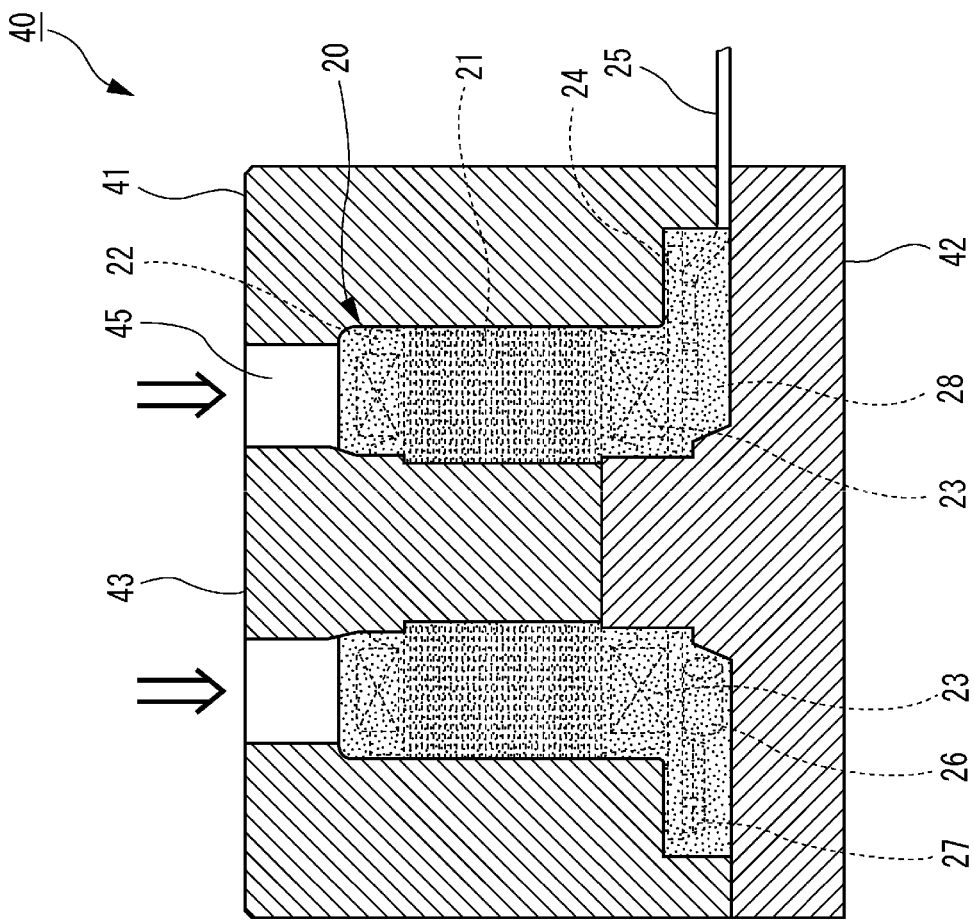
FIG. 2 is a cross sectional view of a die for molding a molded body of FIG. 1.

As shown in FIG. 2, the above molded body 19 is molded in a die 40 which includes an upper die 41 which forms a portion of an annular opening 45 through which the epoxy resin is injected, a lower die 42 which positions the stator 20 and the PC board 24, and a core die 43 which is inserted into a center region of the stator 20 and forms a portion of the annular opening 45. The annular opening 45 is defined by an inner peripheral wall of the upper die 41 and an outer peripheral wall of the core die 43. A large planar area of the annular opening 45 is set so as to be 70% or more of a planar area of the annular stator 20 when viewed in an axial-direction of the core die 43.

As a first step of forming the molded body 19, the PC board 24 assembled as one body together with the stator 20 and the lead wire 25 is disposed at a predetermined place on the lower die 42. Then, the upper die 41 is clamped with the lower die 42, and then, the core die 43 is inserted into a central opening of the annular stator 20. Subsequently, as a vacuuming operation is executed, the epoxy resin with the above-described physical properties is filled through the annular opening 45 formed in an upper face of the upper die 41. At this time, since the planar area of the annular opening 45 is large as mentioned above, the epoxy resin can be efficiently filled into the die even when the epoxy resin of high viscosity is used.

Figure 4:
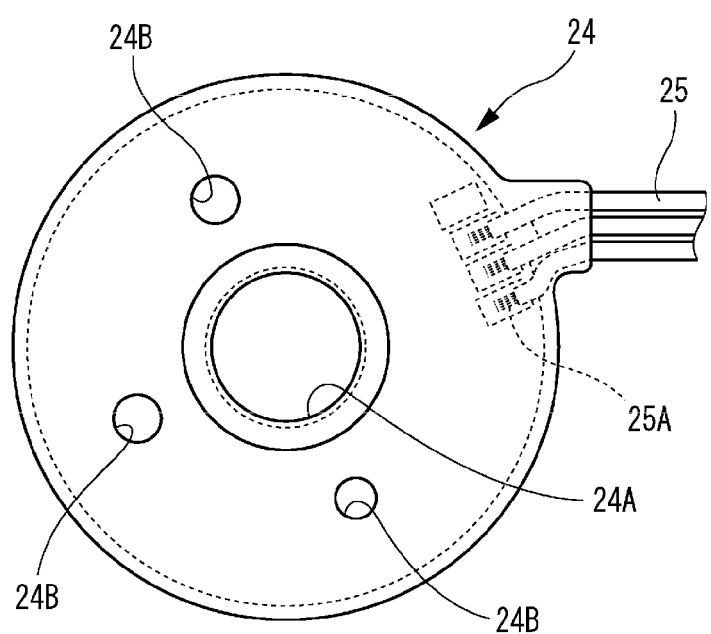
FIG. 4 is a plan view of a PC board of FIG. 1 which has a lead wire.

As shown in FIG. 4, in the PC board 24, a through-hole 24A to insert the bearing housing 15 is formed at a center thereof, and a connection unit 25A to be connected to the lead wire 25 is formed near an outer edge thereof. Air vent holes 24B used in filling the resin are formed at three locations near the through-hole 24A where the electronic parts 26, 27 are not mounted. Accordingly, the epoxy resin filled from/through the annular opening 45 formed in an upper face of the upper die flows downwards along the coil 23 and the stator 20 onto the PC board 24. Thereafter, air within the die 40 and air within the resin are smoothly and easily discharged to the exterior by the air vent holes 24B formed in the PC board 24, and therefore, the epoxy resin can be filled into every corner of the bottom of the PC board 24.

As shown in FIG. 3, in the molded body 19 formed after the die 40 is removed, an entirety of the stator 20 including the core 21, the bobbin 22 and a coil 23, and an entirety of the PC board 24 including the electronic parts 26, 27 and the connection unit 25A to be connected to the lead wire 25 have been completely molded as one body by the epoxy resin. Subsequently, after curing the resin, an upper end face 29 of the molded body 19 at the annular opening 45 is finished by a cutting operation. As a result, a uniform gap is formed between the molded body 19 and a lower face of the rotor 30, so that the fan motor 10 with high reliability can be provided.

Second Illustrative Embodiment

A second illustrative embodiment of the present invention is described with reference to FIG. 5 and FIG. 6. Here, the same components and configurations as those of the first illustrative embodiment will be indicated by the same reference numerals as those of the first illustrative embodiment and will not be explained with details later.

Figure 5:
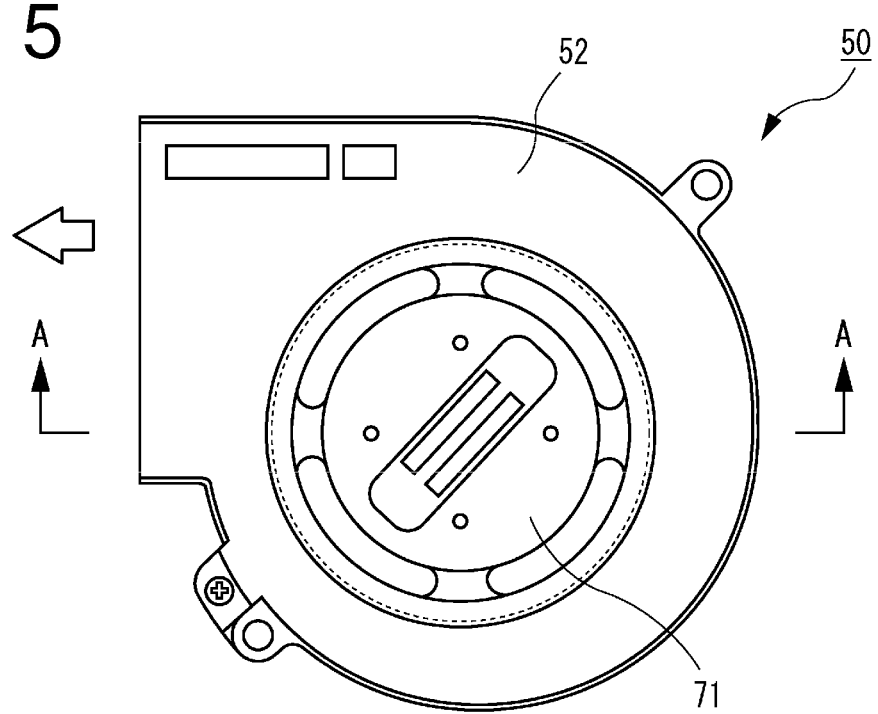
FIG. 5 is a plan view of a fan motor according to a second illustrative embodiment of the present invention.
Figure 6:
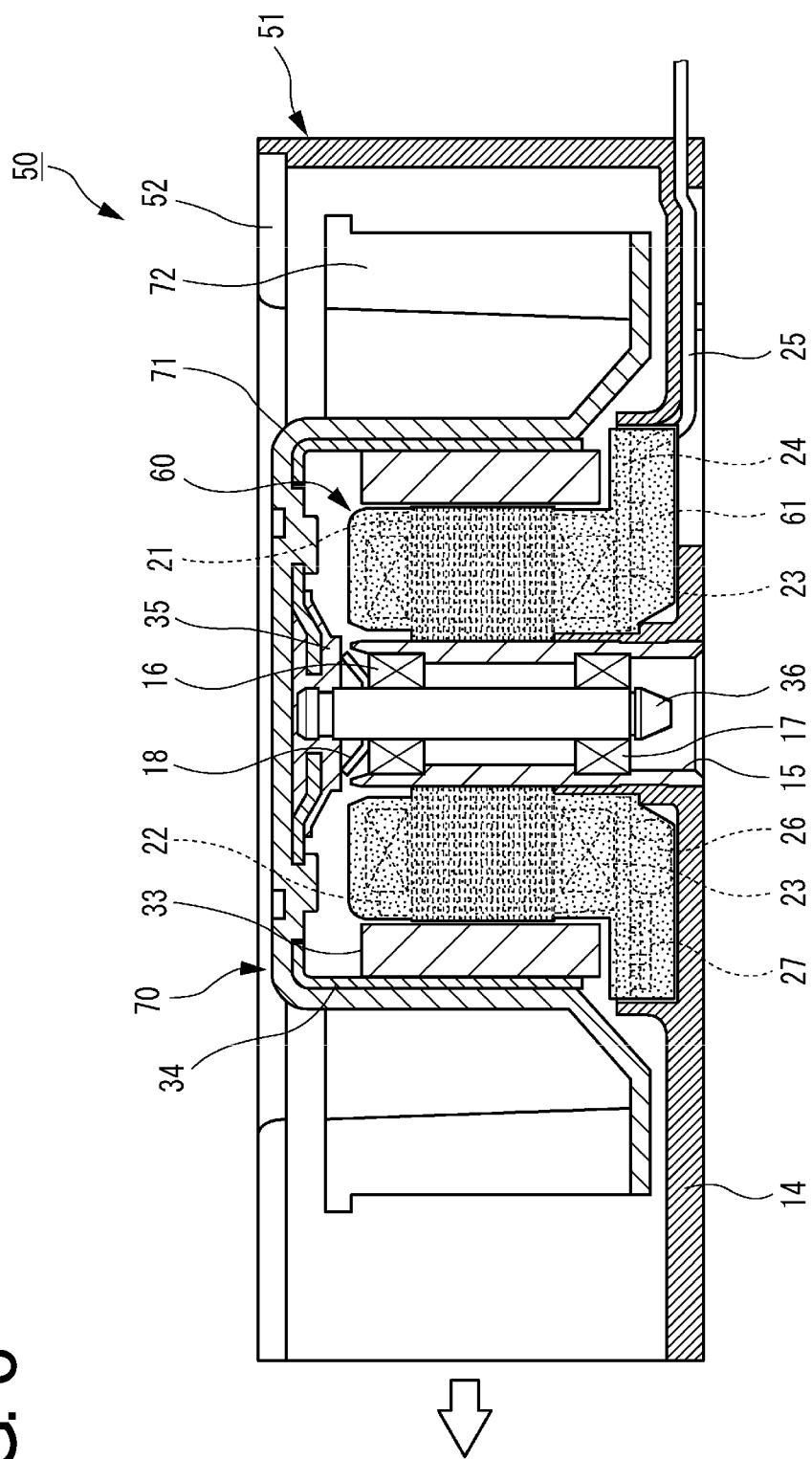
FIG. 6 is a cross sectional view taken along a line A-A of FIG. 5.

As shown in FIG. 5 and FIG. 6, a fan motor 50 according to this second illustrative embodiment of the present invention is a sirocco fan which is used as a blower. The fan motor 50 includes cases 51, 52 made of synthetic resin, a stator 60 and a rotor 70, as main components. The fan motor 50 further includes a lower case 51 and an upper case 52 provided on an upper end of the lower case 51, and an impeller 71 which is fitted at a center region thereof. The impeller 71 includes a plurality of rectangular blades 72 arranged in a peripheral direction thereof. The above-described axial-fan blows a wind in an axial-direction of the shaft, whereas this sirocco fan blows the wind in a rotating direction of the shaft (in the arrow direction). Configurations of the stator 60 and the rotor 70 are the same as those of the stator and rotor of the fan motor 10, and will not be explained in detail.

In the fan motor 50 according to this illustrative embodiment, as in the fan motor 10 according to the first illustrative embodiment, the stator 60, the PC board 24 and a portion of the lead wire 25 which are connected to the PC board 24 are molded in the same die as one body by epoxy resin 61 having the same physical properties, before such components are assembled to the base unit 14 of the lower case 51. That is, an entirety of the stator 60 including the core 21, the bobbin 22 and a coil 23, and an entirety of the PC board 24 including the electronic parts 26, 27 and the connection unit to be connected to the lead wire 25 have been completely molded as one body by the epoxy resin 61 (refer to FIG. 3). Thereafter, after curing the molded body, the finishing operation by cutting the upper cross section of the cured molded body is performed in the same way as that in the first illustrative embodiment.

As described above, according to the fan motors 10, 50 of the first and second illustrative embodiments of the present invention, the stator 20, 60, the PC board 24 and the lead wire 25 are molded as one body by the epoxy resin which has hardness of Shore D85 to D95 after curing and glass transition temperature of 125° C. or higher. Accordingly, the difference in a thermal expansion between the epoxy resin and component parts reduces, and therefore, the internal stress can be reduced, so that the water-proof and cutting fluid-proof properties and the thermal shock-resistant property are improved. As a result, the fan motor can be used for long term even under the condition that the fan motor is exposed to water or cutting fluid.

Moreover, according to the fan motors 10, 50 of the first and second illustrative embodiments of the present invention, the epoxy resin includes 40 to 60 mass % of inorganic particles as the additive agent, so that the hardness of Shore D85 to D95 after curing and the glass transition temperature of 125° C. or higher can be secured as physical properties of the epoxy resin.

Moreover, according to the fan motors 10, 50 of the first and second illustrative embodiments of the present invention, the epoxy resin has a relatively small linear expansion coefficient of $3.7 \times 10^{-5}/°$ C. in the temperature range not higher than the glass transition temperature, so that required thermal shock-resistant property can be secured, and therefore, various component parts included therein can be prevented from being damaged.

Moreover, according to the fan motors 10, 50 of the first and second illustrative embodiments of the present invention, the stator 20, 60, the PC board 24 and the lead wire 25 are molded in a die 40 before those components are provided in the case, a uniform molded body 19 can be formed, and therefore, required water-proof and cutting fluid-proof properties can be secured.

Moreover, according to the fan motors 10, 50 of the first and second illustrative embodiments of the present invention, the planar area of the annular opening 45 is 70% or more of the planar area of the annular stator 20, 60 when viewed in the axial-direction of the core die 43, so that even when the epoxy resin with high viscosity is used, air within the epoxy resin can be smoothly and easily discharged to the exterior. Therefore, the epoxy resin can be efficiently filled into the die 40.

Moreover, according to the fan motors 10, 50 of the first and second illustrative embodiments of the present invention, after the filled resin is cured, the upper end face 29 of the molded body 19 is finished by the cutting operation, so that a uniform gap can be formed between the molded body 19 and the lower face of the rotor 30, 70.

Moreover, according to the fan motors 10, 50 of the first and second illustrative embodiments of the present invention, the air vent holes 24B are formed in the PC board. Accordingly, air within the die 40 and air within the resin, as vacuuming operation being executed, are smoothly and easily discharged to the exterior via the air vent holes 24B, so that the epoxy resin can be filled into every corner of a bottom of the PC board 24.

EXAMPLE

In the following, the epoxy resin for the fan motor according to the embodiment of the present invention is subjected to the evaluation tests (thermal shock test and immersion into cutting-fluid test). Table 1 shows comparison between physical properties of the epoxy resin with high hardness/high glass transition temperature according to the present embodiment and the conventional epoxy resin with low hardness/low glass transition temperature according to a comparative example.

TABLE 1

|  | Present embodiment Epoxy resin with high hardness/high glass transition temperature | Comparative example Epoxy resin with low hardness/low glass transition temperature |
|---|---|---|
| Shore hardness | D85-D95 | D60 |
| Glass transition temperature $T_g$ | 125° C. or higher | 15° C. or lower |
| Linear expansion coefficient ($10^{-5}$/° C.) | $T_g$ or lower: 3.7<br>$T_g$ or higher: 12.0 | $T_g$ or lower: 4.8<br>$T_g$ or higher: 15.0 |

[Thermal Shock Test]

1. Test Method

Both of the fan motor according to the present embodiment and the fan motor of the comparative example were maintained alternately within a tank with the temperature of −55° C. and another tank with the temperature of 125° C., holding the fan motors in respective temperatures for five minutes during each test cycle. Then, functional capability of each motor was inspected for every 50 cycles. At the thermal shock test of a motor used in FA equipment, the motor has to prove thermal shock reliability equivalent to thermal shock reliability of the semiconductor used, and therefore, the test condition required is a total of 100 cycles or more alternating the test temperature between −55° C. and 125° C. It is noted that although an upper temperature limit in the thermal shock test depends on junction temperature of the semiconductor, required test temperature with regard to the motor is generally 125° C.

2. Tested Motor

Five axial-flow fans (No. 1 to No. 5) with 40 mm square and 20 mm of thickness were tested Table 2 shows the results of the thermal shock test.

TABLE 2

| Used resin | Test cycle | | | | |
|---|---|---|---|---|---|
|  | No. 1 | No. 2 | No. 3 | No. 4 | No. 5 |
| Present embodiment | 700 | 750 | 800 | 850 | 850 |
| Comparative example | 50 | 100 | 100 | 150 | 450 |

As shown in Table 2, in case that the motors were molded by the epoxy resin of the comparative example as shown in Table 1, each motor had a large thermal expansion difference due to temperature change, and thereof, the internal stress occurred in the mold, so that the functional capability of each motor was affected. That is, unfavorable effect on functions of motors No. 1 to No. 4 according to the comparative example were observed at first to third inspection corresponding to 50, 100 or 150 cycles respectively. On the other hand, in case of the motors molded by the epoxy resin according to the present embodiment as shown in Table 1, functions of all of the motors No. 1 to No. 5 were not affected at up to 14-th or more than 14-th inspection which corresponds to 700 cycles or more. It seems that this is because in the fan motor according to the present embodiment, within the temperature range of the thermal shock test, the linear expansion coefficient of the epoxy resin kept being similar to that of the various component parts contained inside resin, and therefore, the internal stress was not significant even when applying heat shock, so that cracks in the resin or poor adhesion between the resin and metal were avoided. Accordingly, it was confirmed that the fan motor according to the present embodiment has high reliability against the temperature variation.

[Cutting Fluid Immersion Test]

1. Test Method

Test pieces of the epoxy resins according to the present embodiment and the comparative example were immersed into five different types of the cutting-fluids during three days and weights before and after the immersion were measured.

2. Test Resin Pieces

Test pieces (50×10×6 mm) made of the epoxy resins according to the present embodiment and the comparative example as shown in Table 1 were tested.

Table 3 shows results of the cutting-fluid immersion test.

TABLE 3

| Used resin | | | Cutting fluid type | | | | |
|---|---|---|---|---|---|---|---|
| | | | Solution type (85° C. 72 h) | Emulsion type A (85° C. 72 h) | Emulsion type B (85° C. 72 h) | Non-aqueous cutting fluid (85° C. 72 h) | Kerosene (85° C. 72 h) |
| Present embodiment | Weight | Before test (g) | 5.178 | 5.025 | 5.334 | 5.281 | 5.278 |
| | | After test (g) | 5.196 | 5.041 | 5.350 | 5.288 | 5.278 |
| | | Weight variation (%) | 0.35 | 0.32 | 0.30 | 0.13 | 0.00 |
| Comparative example | Weight | Before test (g) | 4.174 | 4.331 | 4.331 | 4.134 | 4.292 |
| | | After test (g) | 4.239 | 4.438 | 4.431 | 4.136 | 4.294 |
| | | Weight variation (%) | 1.56 | 2.47 | 2.31 | 0.05 | 0.05 |

As shown in Table 3, large differences between the present embodiment and the comparative example did not appear in cases of oil-based non-aqueous cutting-fluid and kerosene, whereas there appeared considerable differences in cases of aqueous solution type, emulsion type A and emulsion type B. That is, when the test piece of the epoxy resin according to the comparative example as shown in Table 1 was tested, weight variation of the test piece due to the cutting-fluid penetrated into the test piece reached approximately 2.0 to 3.0%. On the other hand, when the test piece of the epoxy resin according to the present embodiment as shown in Table 1 was tested, weight variation of the test piece due to the cutting-fluid penetrated into the test piece of the resin reached 0.30 to 0.35%. Accordingly, it was confirmed that the water-proof and cutting fluid-proof properties of the piece of the epoxy resin according to the present embodiment are four to seven times better than those of the piece of the epoxy resin according to the comparative example.

The results of the above thermal shock test and cutting fluid immersion test are summarized in Table 4.

TABLE 4

| Evaluation criteria | | Present embodiment | Comparative example |
|---|---|---|---|
| Thermal shock property | ◎: superior (more than 500 cycles)<br>○: good (250 to 500 cycles)<br>Δ: acceptable (100 to 250 cycles)<br>X: not acceptable (less than 100 cycles) | ◎ | X |
| Cutting fluid-proof property | ◎: superior (less than 1% of weight variation)<br>○: good (1 to 3% of weight variation)<br>Δ: acceptable (3 to 5% of weight variation)<br>X: not acceptable (more than 5% of weight variation) | ◎ | ○ |

As shown in FIG. 4, with regard to the thermal shock test, the comparative example is "not acceptable" because the result was below 100 cycles, whereas the present embodiment has "superior" thermal shock property with the result corresponding to 500 cycles or more. In the meantime, with regard to the cutting-fluid immersion test, the comparative example has "good" cutting fluid-proof property corresponding to 1 to 3% of the weight variation, whereas the present embodiment has "superior" cutting fluid-proof property corresponding to the weight variation less than 1%. Therefore, it can be understood that the epoxy resin according to the present embodiment has better thermal shock property than the epoxy resin according to the comparative example.

While the present invention has been described with reference to the above-mentioned embodiments, the description is illustrative of the invention and is not to be construed as limiting the invention. Many modifications may occur to those skilled in the art without departing from the true spirit and scope of the invention as defined by the appended claims.

What is claimed is:

1. A fan motor comprising:
a case including a cylindrical bearing housing provided at a center thereof, and a base unit fixing the cylindrical bearing housing;
a pair of bearings fitted into the cylindrical bearing housing;
a stator which has a wound coil and a bottom portion to which a PC board including a motor driving circuit and a lead wire for supplying the motor driving circuit with electrical current is fixed;
a shaft supported by the pair of bearings;
a rotor which faces the stator and is fixed to the shaft, and which has an inner peripheral face to which a magnet is attached; and
an impeller which is fixed to an outer peripheral portion of the rotor, and includes a plurality of blades,
wherein the stator, the PC board and the lead wire are molded together using epoxy resin which has hardness of Shore D85 to D95 after curing to form an individual molded body which is a separate member from the case, and
wherein the epoxy resin contains 20 to 30 mass % of bisphenol-A, 40 to 60 mass % of inorganic particles, and 20 to 30 mass % of acid anhydride.

2. The fan motor according to claim 1, wherein the epoxy resin has a linear expansion coefficient of $3.7 \times 10^{-5}/°$ C. in a temperature range not higher than a glass transition temperature of the epoxy resin.

3. The fan motor according to claim 1, wherein the PC board includes a hole embedded with the epoxy resin.

4. The fan motor according to claim 1, wherein an upper end face of the molded body is flat and a uniform gap is formed between the upper end face of the molded body and a lower face of the rotor.

5. A fan motor comprising:
a case including a cylindrical bearing housing provided at a center thereof, and a base unit fixing the cylindrical bearing housing;
a pair of bearings fitted into the cylindrical bearing housing;
a stator which has a wound coil and a bottom portion to which a PC board including a motor driving circuit and a lead wire for supplying the motor driving circuit with electrical current is fixed;
a shaft supported by the pair of bearings;
a rotor which faces the stator and is fixed to the shaft, and which has an inner peripheral face to which a magnet is attached; and
an impeller which is fixed to an outer peripheral portion of the rotor, and includes a plurality of blades,
wherein the stator, the PC board and the lead wire are molded together using epoxy resin which has hardness of Shore D85 to D95 after curing, and the epoxy resin contains 20 to 30 mass % of bisphenol-A, 40 to 60 mass % of inorganic particles, and 20 to 30 mass % of acid anhydride.

6. The fan motor according to claim 5, wherein the epoxy resin has a linear expansion coefficient of $3.7 \times 10^{-5}/°$ C. in a temperature range not higher than a glass transition temperature of the epoxy resin.

7. The fan motor according to claim 5, wherein the PC board includes a hole embedded with the epoxy resin.

8. The fan motor according to claim 5, wherein an upper end face of the epoxy resin molding the stator, the PC board, and the lead wire is a flat surface and a uniform gap is formed between the flat surface and a lower face of the rotor.

* * * * *